United States Patent
Achanta

(10) Patent No.: US 8,559,268 B2
(45) Date of Patent: Oct. 15, 2013

(54) MULTI-FREQUENCY BOREHOLE IMAGER

(75) Inventor: Anjani R. Achanta, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 748 days.

(21) Appl. No.: 12/635,108

(22) Filed: Dec. 10, 2009

(65) Prior Publication Data

US 2010/0149914 A1 Jun. 17, 2010

Related U.S. Application Data

(60) Provisional application No. 61/121,944, filed on Dec. 12, 2008.

(51) Int. Cl.
G01V 1/00 (2006.01)

(52) U.S. Cl.
CPC . *G01V 1/00* (2013.01); *G01V 1/006* (2013.01)
USPC .......................................................... 367/32

(58) Field of Classification Search
USPC .............................................. 367/32, 34, 138
See application file for complete search history.

(56) References Cited

U.S. PATENT DOCUMENTS

| | | | | |
|---|---|---|---|---|
| 4,102,185 A * | 7/1978 | Dowling et al. | ............ | 73/152.05 |
| 5,521,882 A * | 5/1996 | D'Angelo et al. | .............. | 367/32 |
| 5,535,751 A | 7/1996 | Raz | | |
| 5,780,784 A * | 7/1998 | Robbins | ........................ | 181/102 |
| 5,921,939 A | 7/1999 | Danielsson et al. | | |
| 6,440,075 B1 | 8/2002 | Averkiou | | |
| 6,775,388 B1 | 8/2004 | Pompei | | |
| 7,088,639 B2 | 8/2006 | Walls et al. | | |
| 7,301,852 B2 | 11/2007 | Leggett, III et al. | | |
| 7,319,639 B2 | 1/2008 | Heyman | | |
| 7,839,718 B2 * | 11/2010 | Vu et al. | .......................... | 367/32 |
| 8,116,167 B2 * | 2/2012 | Johnson et al. | ................. | 367/32 |

FOREIGN PATENT DOCUMENTS

| | | |
|---|---|---|
| SU | 913303 | 3/1982 |
| WO | 2009152416 | 12/2009 |
| WO | WO2010002607 | 1/2010 |

OTHER PUBLICATIONS

Anjani Achanta, et al., Nonlinear Acoustic Concealed Weapons Detection, Materials Evaluation, Dec. 2005, pp. 1195-1202.
Mostafa Fatemi, et al., Vibro-acoustography: An Imaging Modality Based on Ultrasound-Stimulated Acoustic Emission, Proc. Natl. Acad. Sci., USA, vol. 96, pp. 6603-6608, Jun. 1999, Engineering.
Peter J. Westervelt, Ultrasonic Transducers, Scattering of Sound by Sound, The Journal of Acoustical Society of America, vol. 29, No. 2, Feb. 1957, pp. 199-203.
Notification of Transmittal of the International Search report and the Written Opinion of the Internatinoal searching Authority, or the Declaration, PCT/US2009/067696; Mailed Jul. 23, 2010.
GB1109661.7 Patents Act 1977 Examination Report under Section 18(3). Date of Report 23 UGUST 2012.

* cited by examiner

*Primary Examiner* — Krystine Breier
(74) *Attorney, Agent, or Firm* — Cantor Colburn LLP

(57) ABSTRACT

An apparatus for imaging an earth formation, the apparatus including: a logging instrument configured to be conveyed through a borehole penetrating the earth formation; a source of acoustic waves disposed at the logging instrument, wherein the source is configured to emit first acoustic waves having at least a first frequency and to enable intermodulation of the first acoustic waves in a medium having a nonlinear acoustic property resulting in generating new acoustic waves that are transmitted to the earth formation, the new acoustic waves having a new frequency different from the at least first frequency; and a receiver of acoustic waves configured to receive the new acoustic waves reflected from the earth formation, wherein the received new acoustic waves provide an image of the earth formation.

21 Claims, 4 Drawing Sheets

MULTI-FREQUENCY BOREHOLE IMAGER

CROSS REFERENCE TO RELATED APPLICATIONS

This application claims the benefit of an earlier filing date from U.S. Provisional Application Ser. No. 61/121,944 filed Dec. 12, 2008, the entire disclosure of which is incorporated herein by reference.

BACKGROUND OF THE INVENTION

1. Field of the Invention

The invention disclosed herein relates to imaging an earth formation from a borehole using acoustic waves.

2. Description of the Related Art

Exploration and production of hydrocarbons generally requires accurate measurements of earth formations, which may contain reservoirs of the hydrocarbons. Accurate measurements are important to enable an efficient use of exploration and production resources.

Well logging is a technique used to perform measurements of an earth formation from a borehole penetrating the formation. In well logging, a logging instrument is conveyed through the borehole. The logging instrument performs the measurements of the formation through the borehole. In one embodiment, a wireline is used to support the logging instrument and to transmit measurements to the surface of the earth for processing and recording.

Many types of measurements can be made of the earth formation. One type of measurement creates an image of the earth formation using acoustic waves. The acoustic waves travel from the instrument through a fluid in the borehole and into the earth formation. The earth formation in turn reflects some of the acoustic waves back to the instrument where the waves are recorded. In general, the intensity of acoustic waves reflected from a part of the formation is related to the material composing that particular part of the formation. Thus, the acoustic image can provide a visual indication of the various materials present in the formation.

In general, acoustic images having higher accuracy or higher resolution require acoustic waves with a higher frequency. However, as the frequency of the acoustic waves increase, the more attenuation of the acoustic waves by the borehole fluid occurs. Attenuation of acoustic waves causes weaker reflective waves and, therefore, a weaker acoustic measurement signal. The weaker measurement signal can result in a decrease in accuracy or resolution of the image. Thus, it appears that resolution of an acoustic image of an earth formation is limited by the attenuating characteristics of the borehole fluid.

Therefore, what are needed are techniques to increase the accuracy and resolution of acoustic images of an earth formation. Preferably, the techniques can be used in a borehole containing a fluid.

BRIEF SUMMARY OF THE INVENTION

Disclosed is an apparatus for imaging an earth formation, the apparatus including: a logging instrument configured to be conveyed through a borehole penetrating the earth formation; a source of acoustic waves disposed at the logging instrument, wherein the source is configured to emit first acoustic waves having at least a first frequency and to enable intermodulation of the first acoustic waves in a medium having a nonlinear acoustic property resulting in generating new acoustic waves that are transmitted to the earth formation, the new acoustic waves having a new frequency different from the at least first frequency; and a receiver of acoustic waves configured to receive the new acoustic waves reflected from the earth formation, wherein the received new acoustic waves provide an image of the earth formation.

Also disclosed is a method for imaging an earth formation, the method including: conveying a logging instrument through a borehole penetrating the earth formation; emitting first acoustic waves from the logging instrument, the first acoustic waves comprising at least a first frequency and directed to the earth formation; generating new acoustic waves by intermodulation of the first acoustic waves in a nonlinear acoustic medium wherein the new acoustic waves have a new frequency different from the at least first frequency and are transmitted into the earth formation; and receiving the new acoustic waves that are reflected by the earth formation, wherein the received new acoustic waves provide an image of the earth formation.

Further disclosed is a machine-readable medium having machine-executable instructions for imaging an earth formation by implementing the following steps: emitting first acoustic waves from a logging instrument disposed in a borehole penetrating the earth formation, the first acoustic waves having at least a first frequency and directed to the earth formation; generating new acoustic waves by intermodulation of the first acoustic waves in a nonlinear acoustic medium wherein the new acoustic waves have a new frequency different from the at least first frequency and are transmitted into the earth formation; and receiving the new acoustic waves that are reflected by the earth formation, wherein the received new acoustic waves provide an image of the earth formation.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Disclosed are techniques for increasing the accuracy or resolution of images of an earth formation obtained using acoustic waves. The techniques, which include apparatus and method, call for transmitting acoustic waves from a logging instrument through a borehole penetrating the earth formation. The logging instrument is configured to transmit the acoustic waves such that the acoustic waves experience intermodulation within a fluid disposed in the borehole. The intermodulation causes the transmitted acoustic waves to generate new acoustic waves at a higher frequency than any of the acoustic waves transmitted by the logging instrument. Because the new acoustic waves are generated closer to a wall of the borehole, there is less attenuation of the higher frequency new acoustic waves. Less attenuation of the higher frequency new acoustic waves results in an acoustic image having increased accuracy and resolution.

Before the techniques are discussed in detail, certain definitions are provided. The term "intermodulation" relates to acoustic waves (referred to hereinafter as first acoustic waves) interacting with each other to generate new acoustic waves having a frequency different from the first acoustic waves. The interaction generally occurs in a medium, such as a borehole fluid, having a nonlinear acoustic property. If the first acoustic waves have a frequency f1 and a frequency f2, then the new acoustic waves can have a sum frequency acoustic wave f1+f2 and a difference frequency acoustic wave f1−f2. The new sum frequency acoustic wave can provide an acoustic image with increased resolution. The term "overlap" relates to the first acoustic waves occupying substantially the same space at the same time with the same phase as required for intermodulation of the first acoustic waves.

Figure 1:
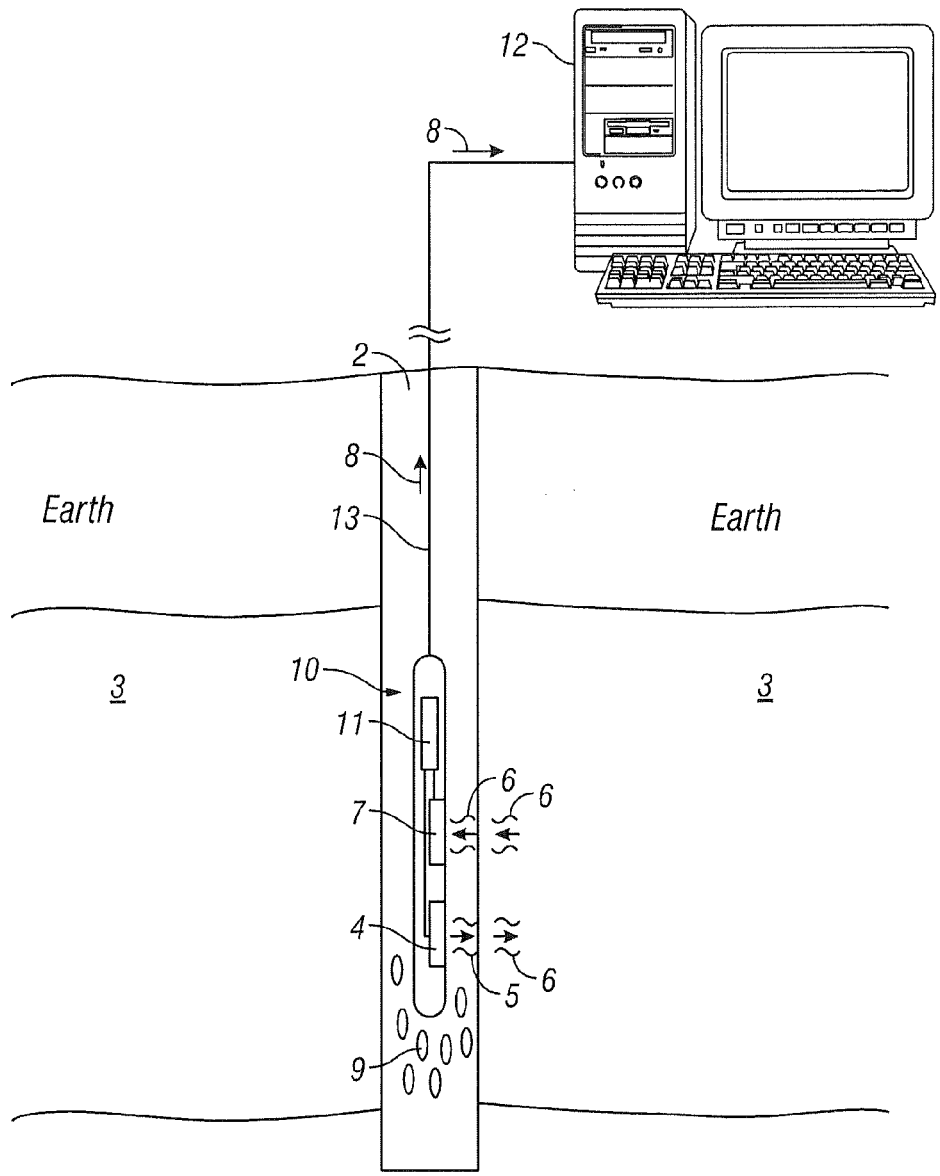
FIG. 1 illustrates an exemplary embodiment of a logging instrument disposed in a borehole penetrating an earth formation.

Reference may be had to FIG. 1. In FIG. 1, there is shown a depiction of an instrument 10 for performing acoustic imaging. In this example, the instrument (or acoustic tool) 10 is disposed within a borehole 2 penetrating earth formation 3. The instrument 10 includes a source 4 of first acoustic waves 5. The first acoustic waves 5 travel through a borehole fluid 9 in the borehole 2 where the first acoustic waves 5 experience intermodulation. As a result of the intermodulation, new acoustic waves 6 of a higher frequency are generated. The new acoustic waves 6 enter the formation 3. The formation 3 reflects at least a portion of the new acoustic waves 6 back to the instrument 10. At the instrument 10, a receiver 7 receives the reflected new acoustic waves 6 and converts the energy of reflected new acoustic waves 6 into a signal 8.

The signal 8 can be recorded and/or processed by an electronic unit 11. Stored data in the electronic unit 11 can be retrieved when the instrument 10 is removed from the borehole 2. Alternatively, the signal 8 can be transmitted by a telemetry system to the surface of the earth and received by a processing system 12 for recording and processing. In addition, the electronic unit 11 can be used to control/operate the source 4. Non-limiting examples of control functions of the electronic unit 11 include modulating the amplitude of the first acoustic waves 5, varying a frequency of the first acoustic waves 5, and varying a phase of the first acoustic waves 5. These control functions can be used to enable and/or optimize the intermodulation of the first acoustic waves 5.

Usually, the borehole 2 is at least partially filled with a mixture of liquids including water, drilling fluid, mud, oil and formation fluids that are indigenous to the formations 3 penetrated by the borehole 2. Drilling mud may also be introduced into the borehole 2. In typical embodiments, the drilling mud is a non-conductive or conductive fluid as is known in the art. The fluid 9 disposed in the borehole 2 generally has a nonlinear acoustic property that enables intermodulation of the first acoustic waves 5.

Referring to FIG. 1, the logging instrument 10 is supported by a wireline 13. The wireline 13 is also used to transmit data (i.e., the signal 8) related to acoustic imaging measurements performed by the logging instrument 10. In other embodiments, the logging instrument 10 can be conveyed through the borehole 2 by slickline, coiled tubing, or a drill string for logging-while-drilling (LWD) measurements. In LWD applications, the logging instrument 10 may be disposed in a collar attached to the drill string.

Figure 2:
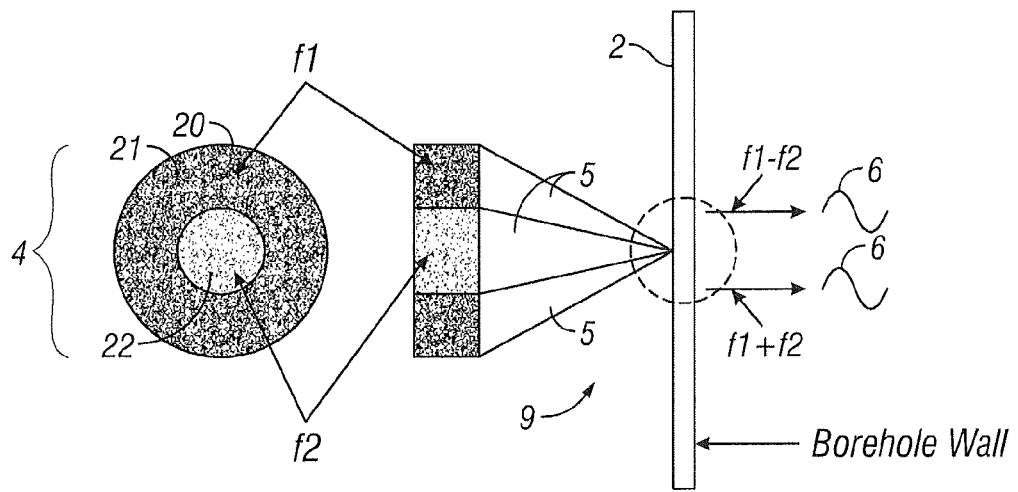
FIG. 2 depicts aspects of an embodiment of a source of acoustic waves having two confocal acoustic transducers.

FIG. 2 depicts aspects of one embodiment of the source 4 for the first acoustic waves 5. Referring to FIG. 2, a single transducer body 20 includes a first acoustic transducer 21 concentric or confocal with a second acoustic transducer 22. The first acoustic transducer 21 emits first acoustic waves 5 with frequency f1 and the second acoustic transducer 22 emits first acoustic waves 5 of frequency f2. The first acoustic transducer 21 and the second acoustic transducer 22 are configured to provide sufficient overlap to enable intermodulation of the first acoustic waves at substantially the wall of the borehole 2. Because of the intermodulation, the new acoustic waves 6 are generated with frequencies f1+f2 and f1−f2. In the embodiment of FIG. 2, the frequencies f1 and f2 are slightly different.

Referring to FIG. 2, the new acoustic waves 6 of frequencies f1 and f2 enter the formation 3. Depending on the properties of materials in the formation 3, some amount of the new acoustic waves 6 will be reflected back towards the instrument 10 (not shown) to be received by the receiver 7 (not shown) and converted to the signal 8 (not shown). Because the new acoustic waves 6 of frequency f1+f2 will produce a higher resolution acoustic image, the receiver 7, the electronic unit 11, or the processing system 12 can be configured to filter out the new acoustic waves 6 of frequency f1−f2. In addition, the waves of frequency f1+f2 can be filtered out to produce an acoustic image made from waves of frequency f1−f2. The two images can then be compared to determine more information about the formation 3. Alternatively, the receiver 7 can be optimized for any of the resulting frequencies of the new acoustic waves 6 that are to be analyzed.

Figure 3:
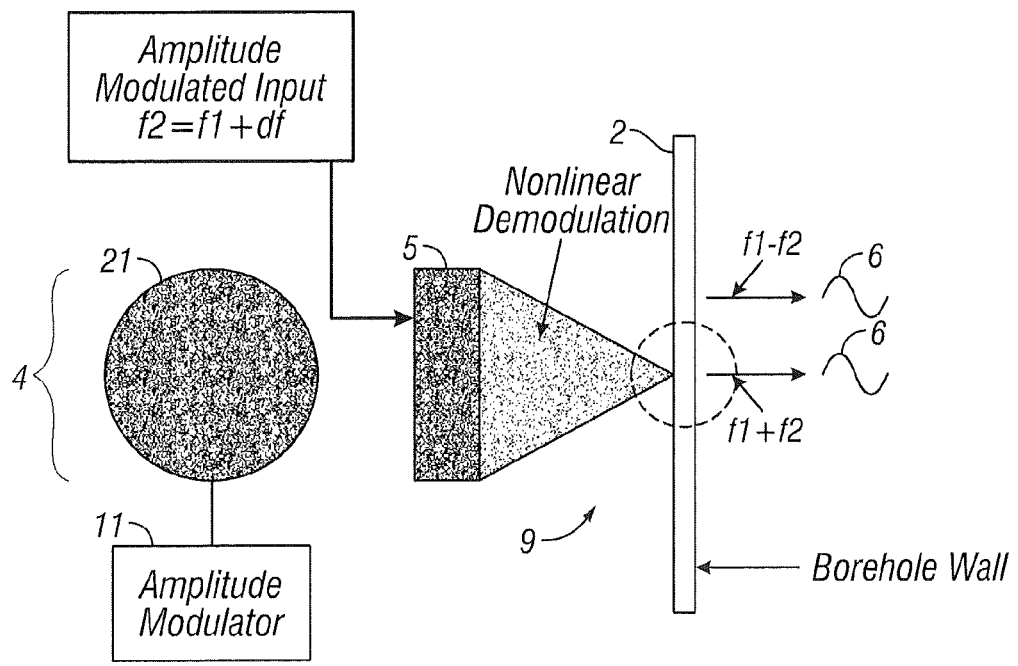
FIG. 3 depicts aspects an embodiment of the source of acoustic waves having one acoustic transducer.

FIG. 3 depicts aspects of another embodiment of the source 4. In the embodiment of FIG. 3, only the first transducer 21 is used to emit the first acoustic waves 5. Referring to FIG. 3, the amplitude of the first acoustic waves 5 is highly modulated, generally at very high input voltages. Because of a nonlinear property of the borehole fluid 9, the first acoustic waves 5 will undergo intermodulation and generate the new acoustic waves 6 at sum and difference frequencies. The amount of amplitude modulation can be varied to determine an optimal amount for causing intermodulation. In the embodiment of FIG. 3, the electronic unit 11 is used to modulate the amplitude of the first acoustic waves 5.

Figure 4A:
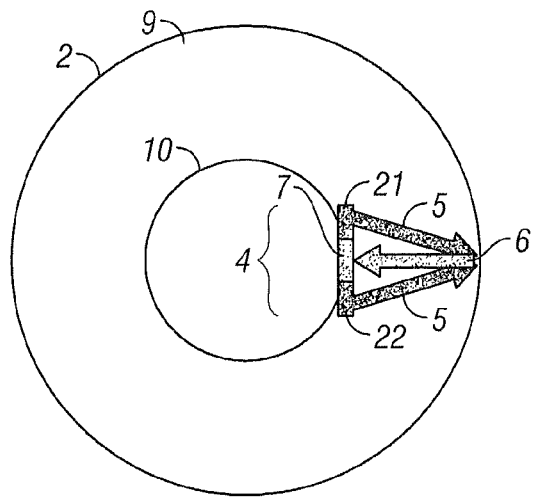
FIGS. 4A and 4B, collectively referred to as FIG. 4, depict aspects of an embodiment of the source of acoustic waves having a receiver disposed between two acoustic transducers.
Figure 4B:
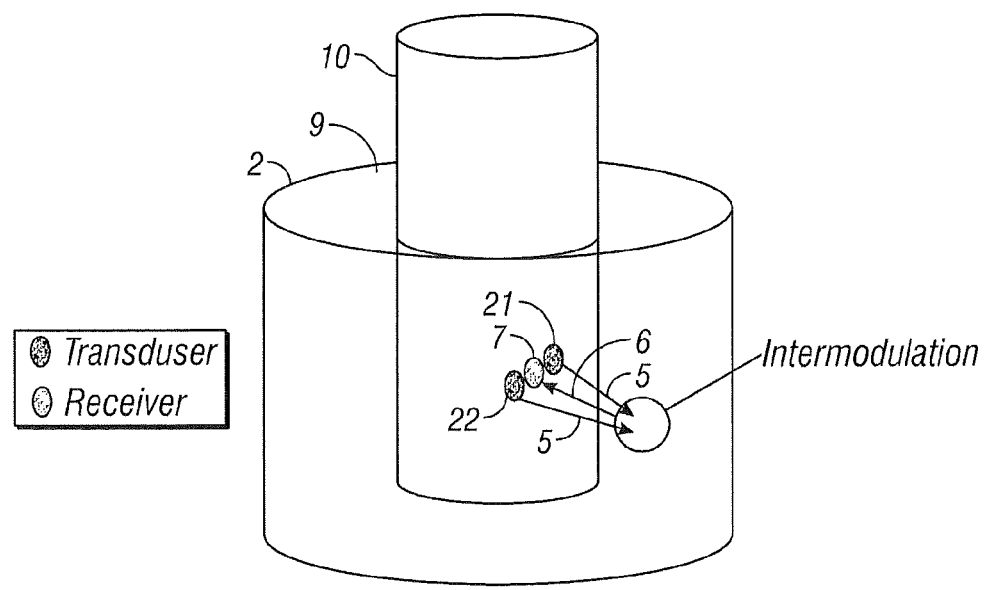

FIG. 4 (4A is a top view and 4B is a three-dimensional side view) depicts aspects of yet another embodiment of the source 4. In the embodiment of FIG. 4, the receiver 7 is disposed between the first acoustic transducer 21 and the second acoustic transducer 22. As in the embodiment of FIG. 2, the first acoustic transducer 21 emits the first acoustic waves 5 having frequency f1 and the second acoustic transducer 22 emits the first acoustic waves 5 having frequency f2. The first acoustic transducer 21 and the second acoustic transducer 22 are positioned so that the first acoustic waves 5 emitted from the transducers 21 and 22 converge substantially at the wall of the borehole 2. The positions of the first acoustic transducer 21 and the second acoustic transducer 22 are configured to produce sufficient overlap to enable intermodulation of the first acoustic waves 5. The intermodulation of the first acoustic waves 5 having frequencies f1 and f2 generate the new acoustic waves 6 having sum frequency f1+f2 and difference frequency f1−f2. The receiver 7 is positioned to receive the new acoustic waves 6 that are reflected by materials in the formation 3.

The logging instrument 10 can be used with the following three methods for imaging the formation 3 around the borehole 2. The imaging can be for 360 degrees or any arc selected. In a first method, a part of the instrument 10 supporting the source 4 of the first acoustic waves 5 and the receiver 7 is rotated around the borehole 2. In a second method, an array of source 4 sets, such as those shown in FIGS. 2, 3 and 4, each with an associated receiver 7 can be disposed around the logging instrument 10 to provide 360 degrees of coverage. In the second method, the new acoustic waves 6 generated by the intermodulation of first acoustic waves 5 from each source 4 meet adjacent new acoustic waves 6 to provide continuous imaging. A third method is similar to the second method but uses an array with a smaller number of the source 4/receiver 7 sets. In the third method, a beam of the new acoustic waves 6 is electronically or mechanically steered (by the electronic unit 11 for example) around the borehole 2 to provide the 360-degree or selected arc coverage. In one embodiment, electronic steering can include applying more power to one of two acoustic transducers in the source 4, thereby tilting a beam of the first acoustic waves 5 more in the direction of the transducer with the higher power output. In one embodiment, mechanical steering can include the source 4 being mounted on a servo-controlled gimbal, thereby electromechanically varying a direction of a beam of the first acoustic waves 5 and, thus, varying a direction of a beam of the new acoustic waves 6.

Use of intermodulation to generate the new acoustic waves 6 at the sum frequency can improve azimuthal resolution by a factor of about two. Amplitude and time-of-flight analysis of the new acoustic waves 6 reflected by the formation 3 can be used to provide information about the formation 3. In addition, processing the reflected new acoustic waves 6 can be performed in the frequency domain using a Fourier Transform or Wavelet analysis. Since the sum frequency (f1+f2) of the new acoustic waves 6 is a result of the sum of the frequencies of the first acoustic waves 5 or an amount of amplitude modulation, a user can control the frequencies of the first acoustic waves 5 or the amount of amplitude modulation to vary the sum frequency of the new acoustic waves 6. Varying the sum frequency of the new acoustic waves 6 can be particularly useful for various types and sizes of borehole features in different drilling muds.

In addition to the intermodulation of the first acoustic waves 5 in the borehole 2, at high enough power intermodulation may also occur in the formation 3 to produce an acoustic image with even more information about the formation 3.

Figure 5:
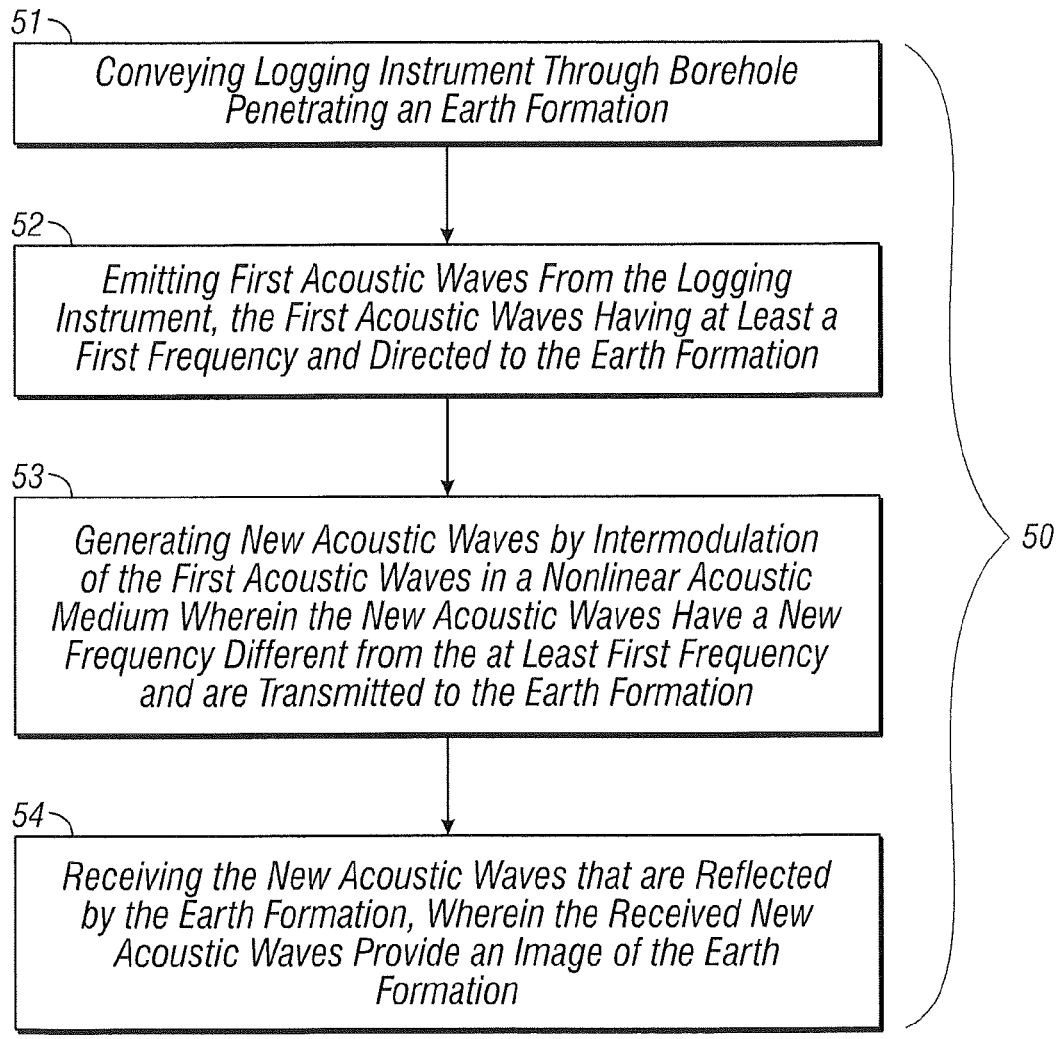
FIG. 5 presents one example of a method for imaging an earth formation.

FIG. 5 presents one example of a method 50 for imaging the earth formation 3. The method 50 calls for (step 51) conveying the logging instrument 10 through the borehole 2 penetrating the earth formation 3. Further, the method 50 calls for (step 52) emitting the first acoustic waves 5 from the logging instrument 10, the first acoustic waves 5 having at least a first frequency and directed to the earth formation 3. Further, the method 50 calls for (step 53) generating the new acoustic waves 6 by intermodulation of the first acoustic waves 5 in the nonlinear acoustic medium 9 wherein the new acoustic waves 6 have a new frequency different from the at least first frequency and are transmitted into the earth formation 3. Further, the method 50 calls for (step 54) receiving the new acoustic waves 6 that are reflected by the earth formation 3, wherein the received new acoustic waves 6 provide an image of the earth formation 3.

In support of the teachings herein, various analysis components may be used, including a digital and/or an analog system. For example, the electronic unit 11 and the processing system 12 can include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for imaging an earth formation, the apparatus comprising:
    a logging instrument configured to be conveyed through a borehole penetrating the earth formation;
    a source of acoustic waves disposed at the logging instrument, wherein the source is configured to emit first acoustic waves having at least a first frequency and to enable intermodulation of the first acoustic waves in a borehole fluid external to the logging instrument, the borehole fluid having a nonlinear acoustic property resulting in generating new acoustic waves that are transmitted to the earth formation, the new acoustic waves having a new frequency different from the at least first frequency; and a receiver of acoustic waves configured to receive the new acoustic waves reflected from the earth formation, wherein the received new acoustic waves provide an image of the earth formation.

2. The apparatus of claim 1, wherein the new frequency is greater than the at least first frequency and any other frequency of the first acoustic waves.

3. The apparatus of claim 1, wherein the new frequency is less than the at least first frequency.

4. The apparatus of claim 1, wherein the source comprises a first transducer and a second transducer.

5. The apparatus of claim 4, wherein the first transducer is configured to operate at the first frequency and the second transducer is configured to operate at a second frequency, the second frequency being different from the first frequency and the new frequency.

6. The apparatus of claim 5, wherein the first transducer and the second transducer are disposed at one transducer body, the first transducer being confocal to the second transducer.

7. The apparatus of claim 4, wherein the receiver is disposed between the first transducer and the second transducer.

8. The apparatus of claim 4, wherein the first transducer and the second transducer are positioned such that the first acoustic waves emitted from each transducer converges at a wall of the borehole.

9. The apparatus of claim 1, further comprising a modulator coupled to the source, wherein the modulator modulates the amplitude of the first acoustic waves to enable the intermodulation.

10. The apparatus of claim 1, wherein the source comprises a plurality of transducers disposed about the instrument such that a beam of first acoustic waves from each transducer at least meets an adjacent beam to provide 360 degrees of coverage around the borehole.

11. The apparatus of claim 1, wherein the source comprises a plurality of transducers, each transducer in the plurality being configured to at least one of electronically and mechanically steer a beam of the new acoustic waves to provide 360 degrees of coverage around the borehole.

12. A method for imaging an earth formation, the method comprising:

conveying a logging instrument through a borehole penetrating the earth formation;

emitting first acoustic waves from the logging instrument, the first acoustic waves comprising at least a first frequency and directed to the earth formation;

generating new acoustic waves by intermodulation of the first acoustic waves in a borehole fluid external to the logging instrument and having a nonlinear acoustic property, wherein the new acoustic waves have a new frequency different from the at least first frequency and are transmitted into the earth formation; and receiving the new acoustic waves that are reflected by the earth formation, wherein the received new acoustic waves provide an image of the earth formation.

13. The method of claim 12, wherein receiving comprises measuring an intensity of the received second acoustic waves.

14. The method of claim 12, further comprising varying at least the first frequency to optimize the intermodulation.

15. The method of claim 12, further comprising varying a phase of the first acoustic waves to optimize the intermodulation.

16. The method of claim 12, further comprising filtering frequencies other than the new frequency from the received new acoustic waves.

17. The method of claim 12, further comprising modulating the amplitude of the first acoustic waves to enable the intermodulation.

18. The method of claim 12, wherein the first acoustic waves further comprise a second frequency.

19. The method of claim 12, further comprising at least one of electronically and mechanically steering a beam of the new acoustic waves 360 degrees around the borehole.

20. The method of claim 12 wherein the logging instrument is conveyed by at least one of a wireline, a slickline, coiled tubing, and a drill string.

21. A non-transitory machine-readable medium comprising machine-executable instructions for imaging an earth formation by implementing the following steps:

emitting first acoustic waves from a logging instrument disposed in a borehole penetrating the earth formation, the first acoustic waves having at least a first frequency and directed to the earth formation;

generating new acoustic waves by intermodulation of the first acoustic waves in a borehole fluid external to the logging instrument and having a nonlinear acoustic property, wherein the new acoustic waves have a new frequency different from the at least first frequency and are transmitted into the earth formation; and receiving the new acoustic waves that are reflected by the earth formation, wherein the received new acoustic waves provide an image of the earth formation.

* * * * *